United States Patent
Neelambaran et al.

(10) Patent No.: US 11,734,787 B2
(45) Date of Patent: Aug. 22, 2023

(54) FOVEATED BINNED RENDERING ASSOCIATED WITH SAMPLE SPACES

(71) Applicant: QUALCOMM Incorporated, San Diego, CA (US)

(72) Inventors: Ashokanand Neelambaran, Bangalore (IN); Piyush Gupta, Bangalore (IN); Kalyan Kumar Bhiravabhatla, Bengaluru (IN); Tao Wang, Sunnyvale, CA (US); Andrew Evan Gruber, Arlington, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/478,694

(22) Filed: Sep. 17, 2021

(65) Prior Publication Data
US 2023/0092394 A1  Mar. 23, 2023

(51) Int. Cl.
| | |
|---|---|
| *G06T 1/20* | (2006.01) |
| *A63F 13/525* | (2014.01) |
| *G06T 3/40* | (2006.01) |
| *G06T 11/40* | (2006.01) |

(52) U.S. Cl.
CPC .............. *G06T 1/20* (2013.01); *A63F 13/525* (2014.09); *G06T 3/40* (2013.01); *G06T 11/40* (2013.01)

(58) Field of Classification Search
CPC ... G06T 1/20; G06T 3/40; G06T 11/40; A63F 13/525
See application file for complete search history.

(56) References Cited

U.S. PATENT DOCUMENTS

| | | | | |
|---|---|---|---|---|
| 2010/0177105 A1* | 7/2010 | Nystad | ............... | G06T 15/005 345/553 |
| 2016/0055608 A1* | 2/2016 | Frascati | ............... | G06T 15/005 345/522 |
| 2017/0316601 A1* | 11/2017 | Kakarlapudi | ......... | G06T 15/205 |

(Continued)

FOREIGN PATENT DOCUMENTS

| | | |
|---|---|---|
| EP | 3598391 A1 | 1/2020 |
| GB | 2573543 A | 11/2019 |

OTHER PUBLICATIONS

International Search Report and Written Opinion—PCT/US2022/040952—ISA/EPO—dated Nov. 25, 2022.

*Primary Examiner* — Sing-Wai Wu
*Assistant Examiner* — Khoa Vu
(74) *Attorney, Agent, or Firm* — Procopio, Cory, Hargreaves & Savitch LLP

(57) ABSTRACT

Aspects presented herein relate to methods and devices for graphics processing including an apparatus, e.g., a GPU. The apparatus may receive a plurality of primitives associated with one or more frames in a scene, a portion of the scene being associated with an upscaled sample space and/or a downscaled sample space. The apparatus may also perform a binning pass for the plurality of primitives, the binning pass being associated with an unscaled sample space, where the binning pass sorts each of the primitives into one or more bins associated with each of the one or more frames. Further, the apparatus may perform one of one or more rendering passes for each of the one or more bins. The apparatus may also rasterize each of the plurality of primitives based on at least one of the upscaled sample space or the downscaled sample space.

26 Claims, 11 Drawing Sheets

(56) References Cited

U.S. PATENT DOCUMENTS

| | | |
|---|---|---|
| 2019/0066365 A1 | 2/2019 | Schmalstieg et al. |
| 2020/0020067 A1* | 1/2020 | Liang .................... G06T 15/005 |
| 2020/0074714 A1* | 3/2020 | Apodaca ............... G06T 15/005 |
| 2020/0193690 A1* | 6/2020 | Dokter ...................... G06T 7/50 |
| 2021/0097642 A1* | 4/2021 | Selvik ....................... G06T 1/20 |
| 2021/0136397 A1 | 5/2021 | Lakshmikantha et al. |

* cited by examiner

FOVEATED BINNED RENDERING ASSOCIATED WITH SAMPLE SPACES

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU) or any apparatus that may perform graphics processing. The apparatus may receive a plurality of primitives associated with one or more frames in a scene, a portion of the scene being associated with at least one of an upscaled sample space for the plurality of primitives or a downscaled sample space for the plurality of primitives. The apparatus may also receive, from a graphics processing unit (GPU) driver, a scaling factor for at least one of the upscaled sample space or the downscaled sample space. Additionally, the apparatus may perform a binning pass for the plurality of primitives, the binning pass being associated with an unscaled sample space for the plurality of primitives, where the binning pass sorts each of the plurality of primitives into one or more bins associated with each of the one or more frames. The apparatus may also perform one of one or more rendering passes for each of the one or more bins, each of the one or more rendering passes being associated with at least one of the upscaled sample space or the downscaled sample space, each of the one or more rendering passes including a viewport transformation for each of the plurality of primitives. The apparatus may also perform a culling process on each of the plurality of primitives after performing the one of the one or more rendering passes for each of the plurality of primitives. Moreover, the apparatus may rasterize each of the plurality of primitives based on at least one of the upscaled sample space or the downscaled sample space. The apparatus may also render each of the plurality of primitives based on the rasterization of each of the plurality of primitives. The apparatus may also transmit the rendered plurality of primitives after rendering each of the plurality of primitives.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
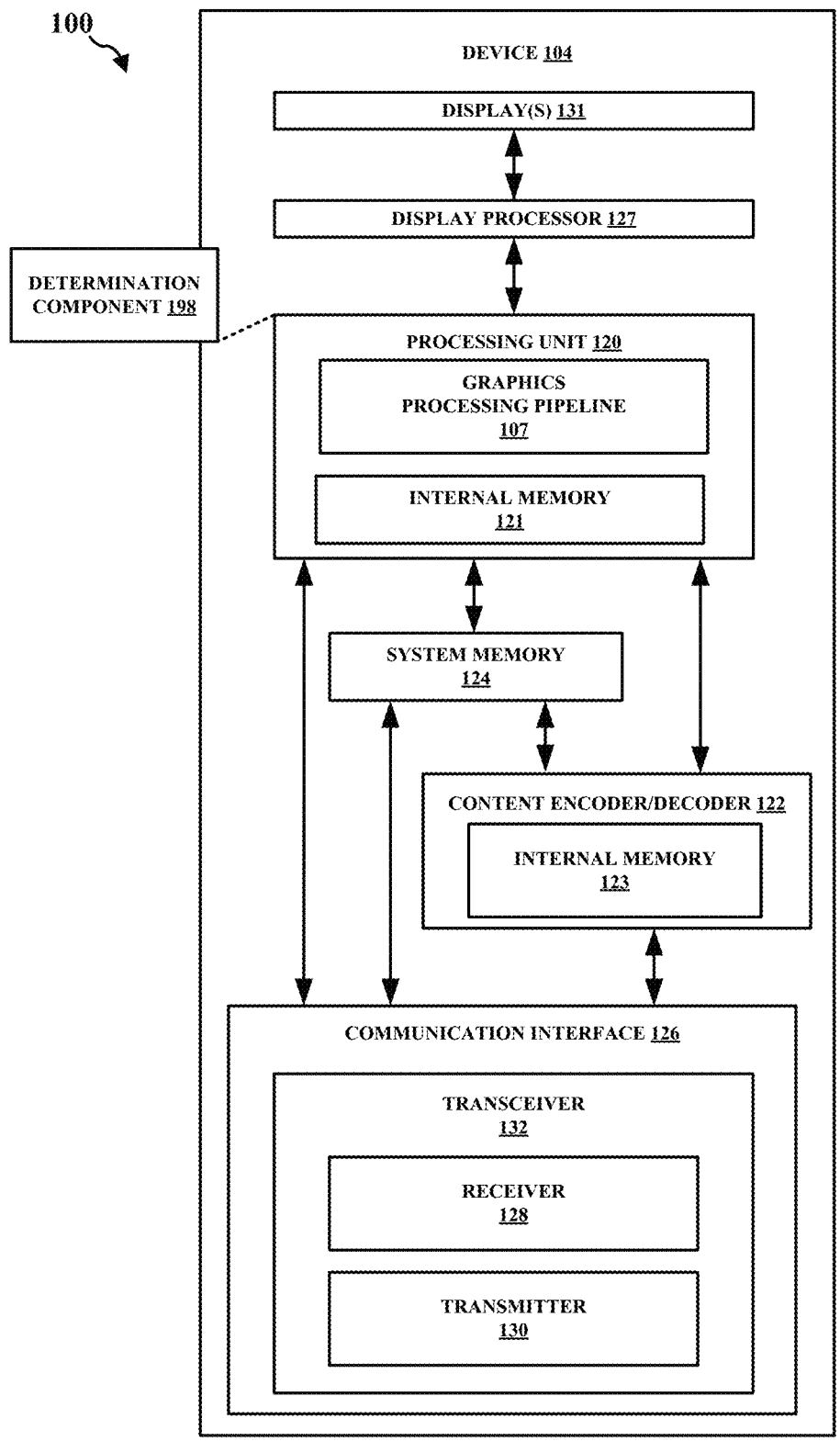
FIG. 1 is a block diagram that illustrates an example content generation system in accordance with one or more techniques of this disclosure.

Some aspects of graphics processing may utilize foveated rendering, which is another optimization technique employed in scenes for rendering virtual reality (VR), augmented reality (AR), or extended reality (XR). Further, some aspects of graphics processing may utilize foveated-binned rendering, which is also utilized mainly for VR/AR/XR applications. In foveated-binned rendering, bins at the center of the field-of-view (FoV) may be rendered in a full resolution (e.g., bins in a binning pass), while bins outside of the main FoV (e.g., bins in a rendering pass), may be rendered in a lower or downscaled resolution, e.g., 1x:2y, 1x:4y, 2x:4y, etc. Some aspects of graphics processing may also utilize a viewport transformation process (e.g., Xform). The viewport transformation process uses parameters (i.e., scales and offsets) that may be dependent on the resolution of the render target. Foveated-binned rendering utilizes different bin sizes in a downscale rendering pass. For instance, in foveated-binned rendering, the binning pass may use original viewport scales and viewport offsets, whereas the rendering pass may use adjusted viewport scales and offsets for each bin to achieve the same or lower resolutions. As the viewport scales may be different between the binning pass and rendering pass, the same primitive/triangle may have different screen coordinates between the binning pass and rendering pass. Based on this, a primitive/triangle may not cover any samples in the binning pass, but it may cover valid samples in the rendering pass (e.g., due to finite precision, face flipping, etc.). This process may result in visual artifacts in the scene. As indicated herein, some graphics processing issues may be the result of viewport parameters being different between binning and rendering passes, such as including different scale factors. These different scale factors may result in visual artifacts in the scene. In an attempt to avoid these artifacts, software at a GPU may disable multiple culling algorithms and may force primitives to be visible in the binning pass. However, this may have a large effect on the performance of the GPU. Aspects of the present disclosure may provide graphics processing techniques that include similar viewport parameters between a binning pass and a rendering pass. For instance, aspects of the present disclosure may include a viewport transformation without scaling between the binning and rendering passes. Additionally, aspects of the present disclosure may include similar scale factors or offset parameters between a binning pass and a rendering pass. For example, aspects of the present disclosure may keep scaling or offset parameters in a downscaled space.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to receive a plurality of primitives associated with one or more frames in a scene, a portion of the scene being associated with at least one of an upscaled sample space for the plurality of primitives or a downscaled sample space for the plurality of primitives. The determination component 198 may also be configured to receive, from a graphics processing unit (GPU) driver, a scaling factor for at least one of the upscaled sample space or the downscaled sample space. The determination component 198 may also be configured to perform a binning pass for the plurality of primitives, the binning pass being associated with an unscaled sample space for the plurality of primitives, where the binning pass sorts each of the plurality of primitives into one or more bins associated with each of the one or more frames. The determination component 198 may also be configured to perform one of one or more rendering passes for each of the one or more bins, each of the one or more rendering passes being associated with at least one of the upscaled sample space or the downscaled sample space, each of the one or more rendering passes including a viewport transformation for each of the plurality of primitives. The determination component 198 may also be configured to perform a culling process on each of the plurality of primitives after performing the one of the one or more rendering passes for each of the plurality of primitives. The determination component 198 may also be configured to rasterize each of the plurality of primitives based on at least one of the upscaled sample space or the downscaled sample space. The determination component 198 may also be configured to render each of the plurality of primitives based on the rasterization of each of the plurality of primitives. The determination component 198 may also be configured to transmit the rendered plurality of primitives after rendering each of the plurality of primitives. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
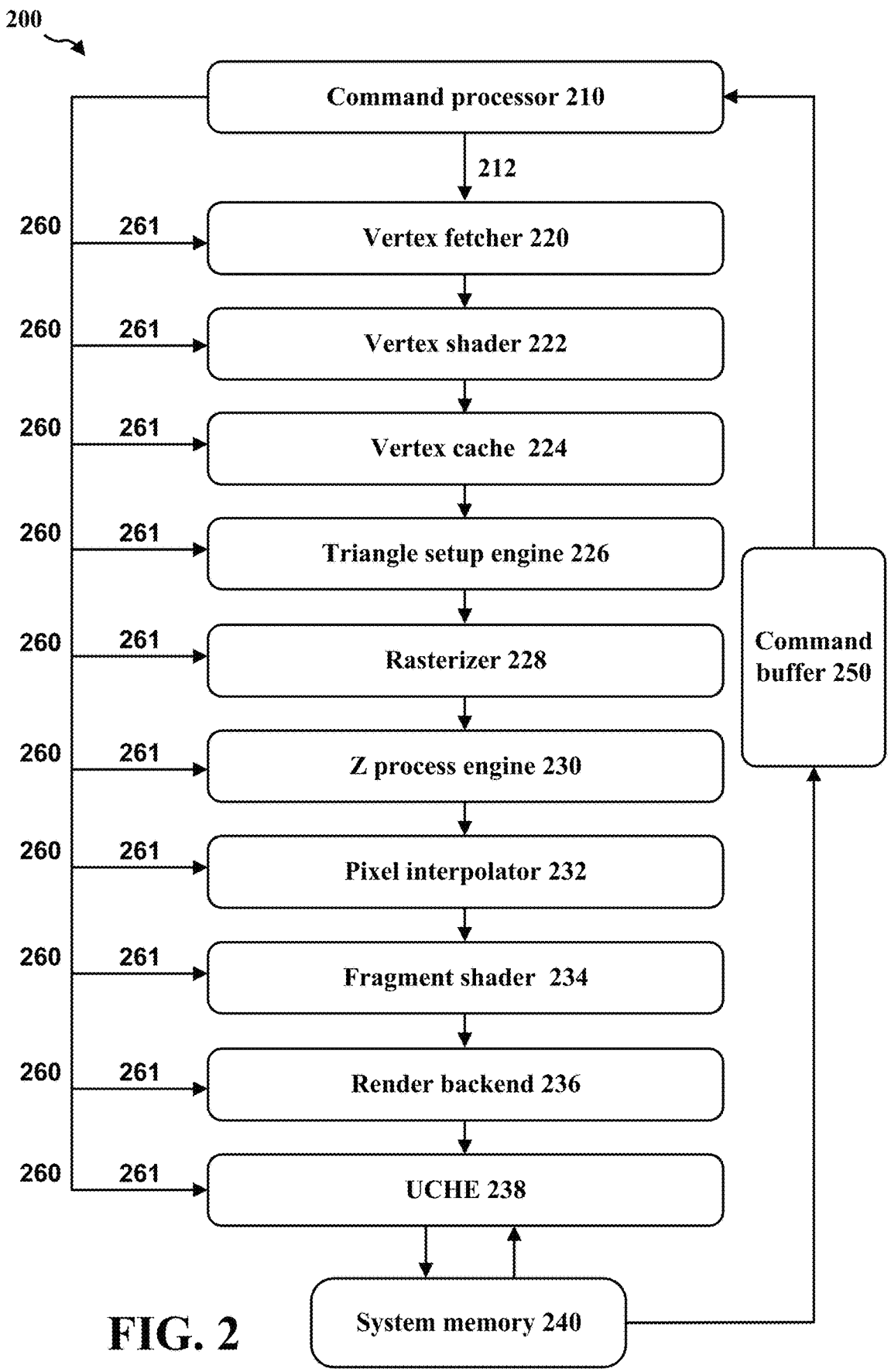
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUs according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call data packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

In some aspects, GPUs may apply the drawing or rendering process to different bins or tiles. For instance, a GPU may render to one bin, and perform all of the draws for the primitives or pixels in the bin. During the process of rendering to a bin, the render targets may be located in the GMEM. In some instances, after rendering to one bin, the content of the render targets may be moved to a system memory and the GMEM may be freed for rendering the next bin. Additionally, a GPU may render to another bin, and perform the draws for the primitives or pixels in that bin. Therefore, in some aspects, there might be a small number of bins, e.g., four bins, that cover all of the draws in one surface. Further, GPUs may cycle through all of the draws in one bin, but perform the draws for the draw calls that are visible, i.e., draw calls that include visible geometry. In some aspects, a visibility stream may be generated, e.g., in a binning pass, to determine the visibility information of each primitive in an image or scene. For instance, this visibility stream may identify whether a certain primitive is visible or not. In some aspects, this information may be used to remove primitives that are not visible, e.g., in the rendering pass. Also, at least some of the primitives that are identified as visible may be rendered in the rendering pass.

In some aspects of tiled rendering, there may be multiple processing phases or passes. For instance, the rendering may be performed in two passes, e.g., a visibility or bin-visibility pass and a rendering or bin-rendering pass. During a visibility pass, a GPU may input a rendering workload, record the positions of the primitives or triangles, and then determine which primitives or triangles fall into which bin or area. In some aspects of a visibility pass, GPUs may also identify or mark the visibility of each primitive or triangle in a visibility stream. During a rendering pass, a GPU may input the visibility stream and process one bin or area at a time. In some aspects, the visibility stream may be analyzed to determine which primitives, or vertices of primitives, are visible or not visible. As such, the primitives, or vertices of primitives, that are visible may be processed. By doing so, GPUs may reduce the unnecessary workload of processing or rendering primitives or triangles that are not visible.

In some aspects, during a visibility pass, certain types of primitive geometry, e.g., position-only geometry, may be processed. Additionally, depending on the position or location of the primitives or triangles, the primitives may be sorted into different bins or areas. In some instances, sorting primitives or triangles into different bins may be performed by determining visibility information for these primitives or triangles. For example, GPUs may determine or write visibility information of each primitive in each bin or area, e.g., in a system memory. This visibility information may be used to determine or generate a visibility stream. In a rendering pass, the primitives in each bin may be rendered separately. In these instances, the visibility stream may be fetched from memory used to drop primitives which are not visible for that bin.

Some aspects of GPUs or GPU architectures may provide a number of different options for rendering, e.g., software rendering and hardware rendering. In software rendering, a driver or CPU may replicate an entire frame geometry by processing each view one time. Additionally, some different states may be changed depending on the view. As such, in software rendering, the software may replicate the entire workload by changing some states that may be utilized to render for each viewpoint in an image. In certain aspects, as GPUs may be submitting the same workload multiple times for each viewpoint in an image, there may be an increased amount of overhead. In hardware rendering, the hardware or GPU may be responsible for replicating or processing the geometry for each viewpoint in an image. Accordingly, the hardware may manage the replication or processing of the primitives or triangles for each viewpoint in an image.

Figure 3:
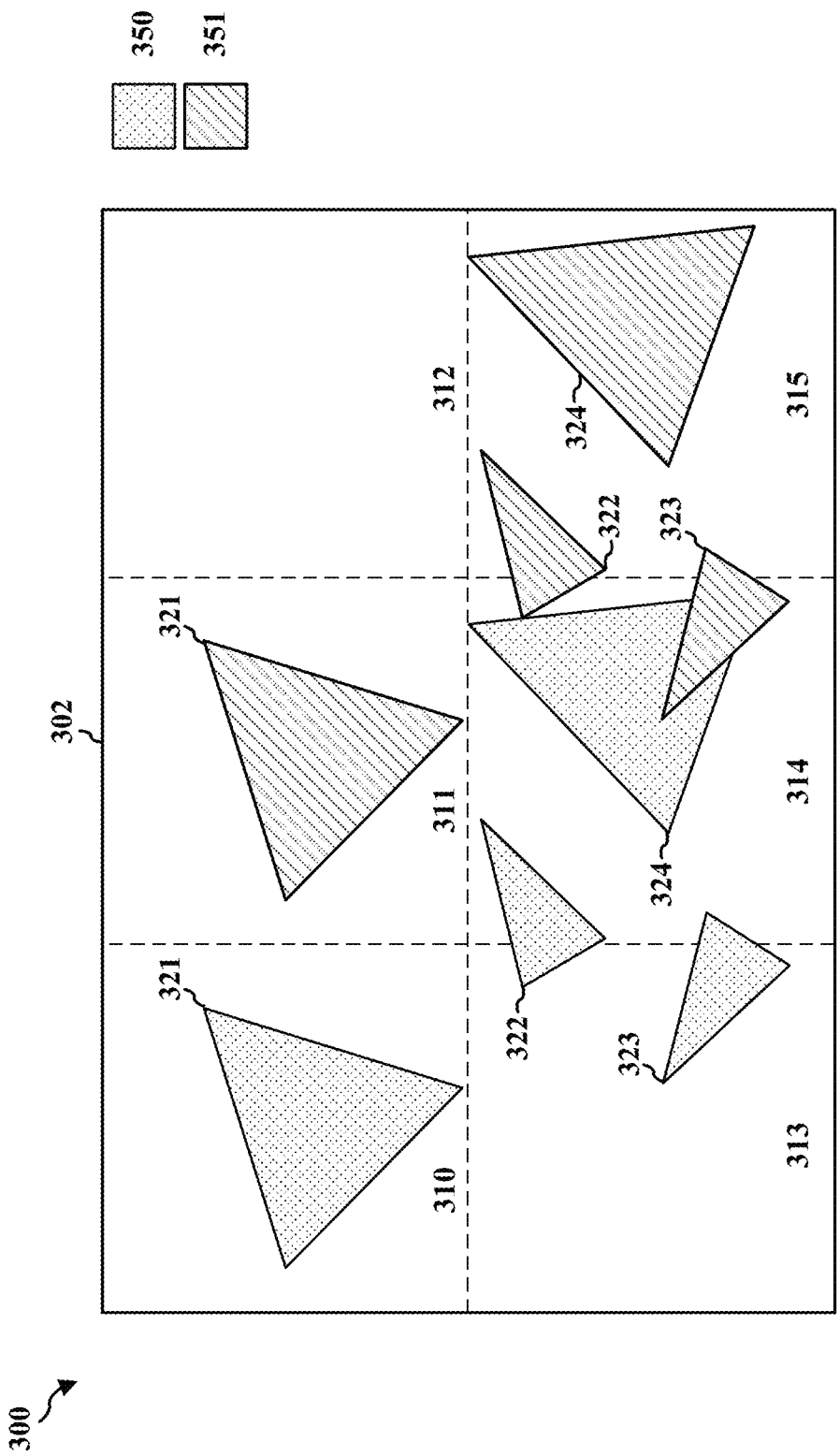
FIG. 3 illustrates an example image or surface in accordance with one or more techniques of this disclosure.

FIG. 3 illustrates image or surface 300, including multiple primitives divided into multiple bins. As shown in FIG. 3, image or surface 300 includes area 302, which includes primitives 321, 322, 323, and 324. The primitives 321, 322, 323, and 324 are divided or placed into different bins, e.g., bins 310, 311, 312, 313, 314, and 315. FIG. 3 illustrates an example of tiled rendering using multiple viewpoints for the primitives 321-324. For instance, primitives 321-324 are in first viewpoint 350 and second viewpoint 351. As such, the GPU processing or rendering the image or surface 300 including area 302 may utilize multiple viewpoints or multi-view rendering.

As indicated herein, GPUs or graphics processor units may use a tiled rendering architecture to reduce power consumption or save memory bandwidth. As further stated above, this rendering method may divide the scene into multiple bins, as well as include a visibility pass that identifies the triangles that are visible in each bin. Thus, in tiled rendering, a full screen may be divided into multiple bins or tiles. The scene may then be rendered multiple times, e.g., one or more times for each bin.

In aspects of graphics rendering, some graphics applications may render to a single target, i.e., a render target, one or more times. For instance, in graphics rendering, a frame buffer on a system memory may be updated multiple times. The frame buffer may be a portion of memory or random access memory (RAM), e.g., containing a bitmap or storage, to help store display data for a GPU. The frame buffer may also be a memory buffer containing a complete frame of data. Additionally, the frame buffer may be a logic buffer. In some aspects, updating the frame buffer may be performed in bin or tile rendering, where, as discussed above, a surface is divided into multiple bins or tiles and then each bin or tile may be separately rendered. Further, in tiled rendering, the frame buffer may be partitioned into multiple bins or tiles.

As indicated herein, some aspects of graphics processing may utilize different types of rendering, e.g., tiled or binned rendering. Tiled rendering or binned rendering is the process of subdividing a computer graphics scene by a rectangular grid in a display space and separately rendering each section of the grid (i.e., the tile or bin). Tiled or binned rendering may be utilized by graphics processing units (GPUs) that have limited memory access bandwidth. In some instances, tiled rendering may be performed in a certain number of passes, e.g., two passes, in order to maximize the GPU utilization, such as a binning pass and a rendering pass.

In tiled or binned rendering, a binning pass may analyze a frame and determine the primitives belonging to each bin or tile. This may result in a primitives-to-bin map, which may be stored in an intermediate data structure. The rendering pass may render each bin or tile separately. For each bin or tile, an intermediate map may be queried, and the primitives that belong to the respective bin/tile may be rendered to an on-chip buffer. At the end of the rendering pass of each bin, the on-chip buffer may be resolved to the system memory or display buffer.

Figure 4:
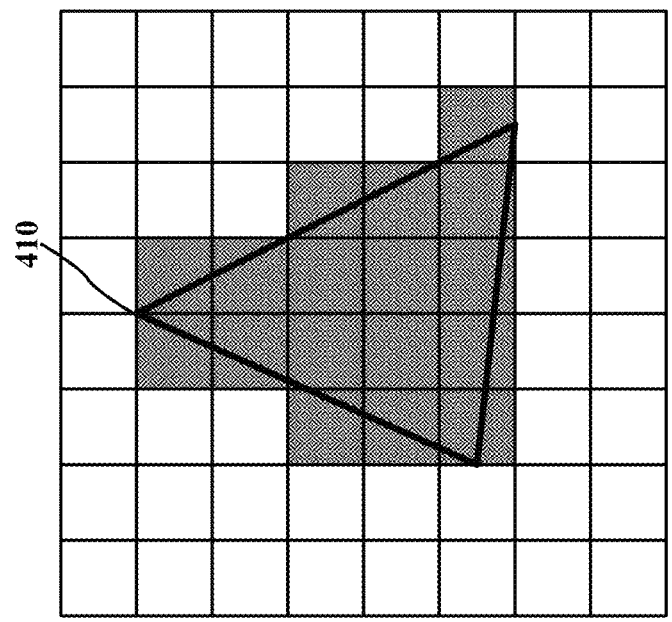
FIG. 4 is a diagram illustrating an example rasterization process.

FIG. 4 illustrates a diagram 400 of one example of a rasterization process. More specifically, diagram 400 in FIG. 4 displays a rasterization process for primitive 410. As shown in FIG. 4, rasterization is the process in a GPU that generates the sample coverage for primitives, e.g., primitive 410. Typically, the rasterizer checks each sample against the edges of a primitive/triangle and marks it as covered if the sample is inside of the primitive/triangle. In other words, a rasterizer may test each sample against the edge equations of the primitive/triangle edges. As shown in FIG. 4, if a sample is inside of the primitive/triangle, e.g., primitive 410, it may be marked as covered.

Additionally, some aspects of graphics processing may utilize foveated rendering, which is another optimization technique employed in scenes for rendering virtual reality (VR), augmented reality (AR), or extended reality (XR). In foveated rendering, an eye tracker, e.g., an eye tracker integrated on a VR headset, may be used to identify a main field-of-view (FoV) in a render target. The resulting FoV information may be used to render various regions in the scene with different resolutions. This may considerably reduce the render workload without significantly compromising the visual quality of the rendered image. Further, some aspects of graphics processing may utilize foveated-binned rendering, which is also utilized for VR/AR/XR applications. In foveated-binned rendering, bins at the center of the FoV may be rendered in a full resolution (e.g., bins in a binning pass), while bins outside of the main FoV (e.g., bins in a rendering pass), may be rendered in a lower or downscaled resolution, e.g., 1x:2y, 1x:4y, 2x:4y, etc.

Some aspects of graphics processing may also utilize a viewport transformation process (e.g., Xform). Viewport transformation is a mathematical step in GPU processing that converts the primitives from a normalized device coordinate (NDC) space to a final screen space. The viewport transformation process uses parameters (i.e., scales and offsets) that may be dependent on the resolution of the render target. These viewport transformation scales and offsets may also directly affect the primitive geometry.

Foveated-binned rendering utilizes different bin sizes in a downscale rendering pass. For instance, in foveated-binned rendering, the binning pass may use original viewport scales and viewport offsets, whereas the rendering pass may use adjusted viewport scales and offsets for each bin to achieve the same or lower resolutions. For example, the rendering pass may utilize various scales (e.g., 1:1, 1:2, or 1:4 viewport scale) in X and/or Y directions for each bin. As the viewport scales may be different between the binning pass and rendering pass, the same primitive/triangle may have different screen coordinates between the binning pass and rendering pass. For instance, different viewport parameters may cause vertices to land on different positions in a sample space between the binning pass and the rendering pass. Based on this, a primitive/triangle may not cover any samples in the binning pass, but it may cover valid samples in the rendering pass (e.g., due to finite precision, face flipping, etc.). This process may result in visual artifacts in the scene. Moreover, this may occur at the frame level as well as the bin level, which may be a generic problem of a larger extent in the VR/AR/XR segment.

Figure 5:
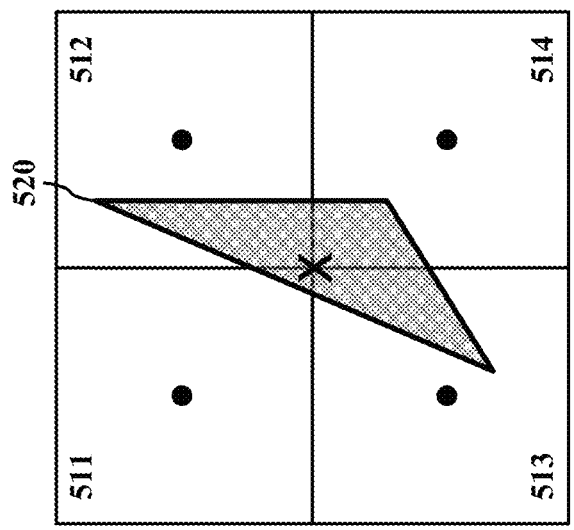
FIG. 5 is a diagram illustrating an example bin foveation process.

FIG. 5 illustrates a diagram 500 of one example of a bin foveation process. As shown in FIG. 5, diagram 500 is an example bin foveation process including bin 511, bin 512, bin 513, bin 514, and primitive 520. More specifically, FIG. 5 displays a visibility issue with primitive 520 in the bin foveation process. That is, primitive 520 includes a sample coverage issue in bins 511-514. As shown in FIG. 5, the dots in each of bins 511-514 correspond to the samples in a 1x scale, while the 'x' at the center of bins 511-514 corresponds to the sample in a 2x scale. For instance, the primitive 520 does not cover any sample in the 1x scale, so it may be removed during the binning process. This may result in artifacts in the scene.

Figure 6B:
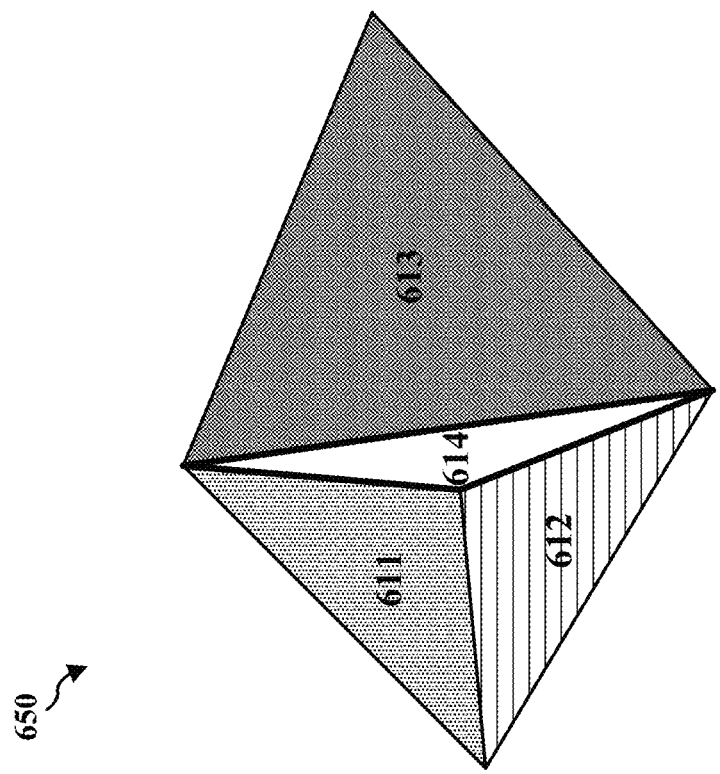
FIG. 6B is a diagram illustrating an example bin foveation process.
Figure 6A:
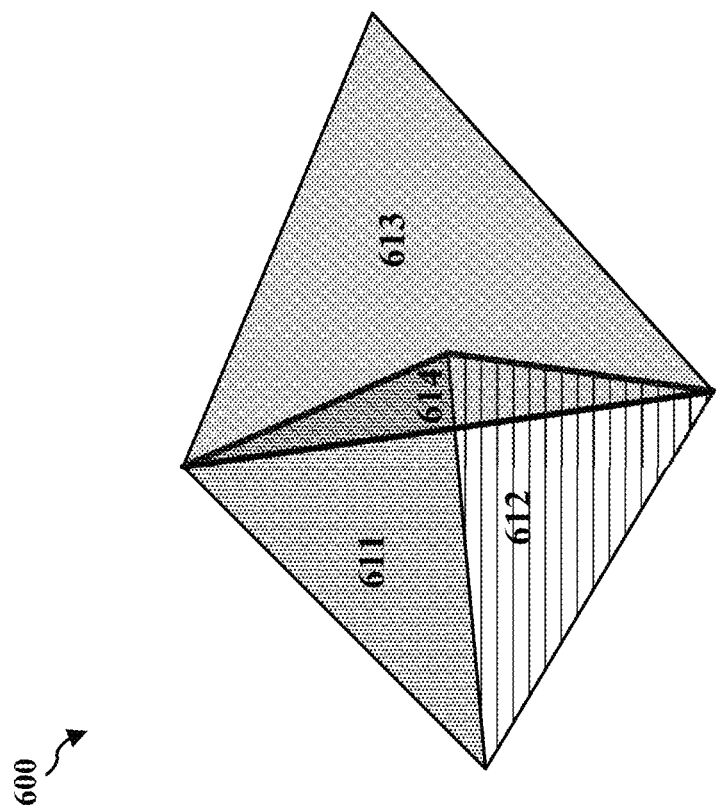
FIG. 6A is a diagram illustrating an example bin foveation process.

FIGS. 6A and 6B illustrate diagrams 600 and 650, respectively, of another example of a bin foveation process. As shown in FIGS. 6A and 6B, diagrams 600 and 650 are an example bin foveation process including primitives 611, 612, 613, and 614. More specifically, FIGS. 6A and 6B display a visibility issue with primitive 614 in the binning pass in FIG. 6A and the rendering pass in FIG. 6B. That is, the face of primitive 614 flips between the binning pass in FIG. 6A and the rendering pass in FIG. 6B. For instance, due to a finite precision in the fixed-point operations inside a GPU, primitives/triangles may flip their face due to different viewport scales and float-to-fix point snapping. This primitive/triangle face flipping issue may result in artifacts in the scene.

As shown in FIG. 6A, primitive 614 is a back-facing triangle in the binning pass, and all samples are covered by primitives 611/612/613. For instance, primitive 614 is culled in binning due to a back-face culling. However, as shown in FIG. 6B, in the rendering pass, primitive 614 flips to become visible due to fix point snapping. Further, a few samples may be covered by primitive 614. As primitive 614 is already culled in binning, it may create a hole in the mesh at its place during downscale rendering. This may also result in visual artifacts. Additionally, primitives that are detected in a "zero area" in the binning pass may end up being in a "non-zero area" in the rendering pass. This is another potential cause for visual artifacts.

Figure 7:
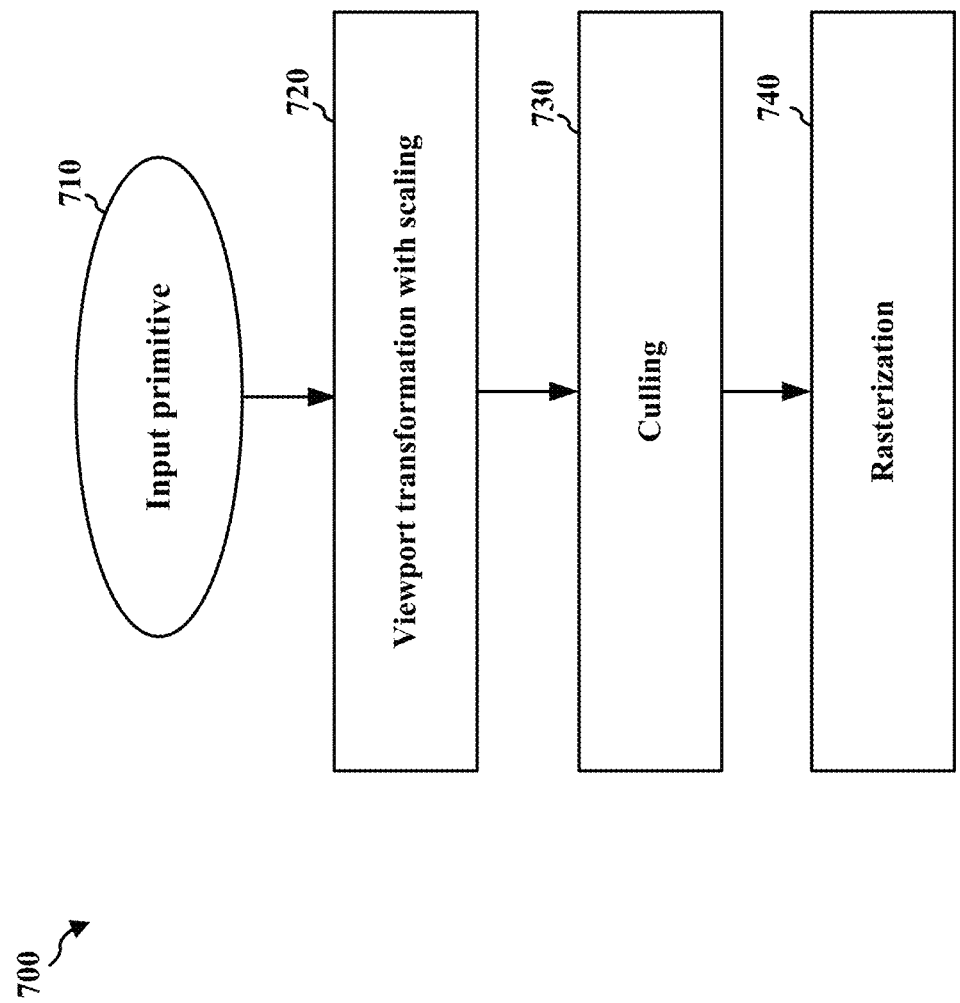
FIG. 7 is a diagram illustrating an example rendering pass.

FIG. 7 illustrates a diagram 700 of one example of a rendering pass. As shown in FIG. 7, diagram 700 is an example rendering pass including steps 710, 720, 730, and 740. More specifically, FIG. 7 displays a rendering pass including a viewport transformation with scaling compared to a binning pass. That is, the rendering pass in FIG. 7 includes viewport scaling and offset parameters that are different from a binning pass. As depicted in FIG. 7, at step 710, an input primitive/triangle is received. At step 720, a viewport transformation is performed with scaling (i.e., compared to a binning pass). At step 730, a culling process is performed. At step 740, a rasterization process is performed. As there are different scale factors between the binning and rendering, this may result in visual artifacts in the scene.

As indicated above, some graphics processing issues may be the result of viewport parameters being different between binning and rendering passes, such as including different scale factors. These different scale factors may result in visual artifacts in the scene. In an attempt to avoid these artifacts, software at a GPU may disable multiple culling algorithms and may force primitives to be visible in the binning pass. However, this may have a large effect on the performance of the GPU. As such, it may be beneficial to include similar viewport parameters between a binning pass and a rendering pass. For instance, it may be beneficial to including viewport transformation without scaling between the binning and rendering passes. Further, it may be beneficial to include similar scale factors or offset parameters between a binning pass and a rendering pass. For example, it may be beneficial to keep scaling or offset parameters in a downscaled space.

Aspects of the present disclosure may provide graphics processing techniques that include similar viewport parameters between a binning pass and a rendering pass. For instance, aspects of the present disclosure may include a viewport transformation without scaling between the binning and rendering passes. Additionally, aspects of the present disclosure may include similar scale factors or offset parameters between a binning pass and a rendering pass. For example, aspects of the present disclosure may keep scaling or offset parameters in a downscaled space.

In some instances, aspects of the present disclosure may perform an artifact-free downscale rendering while keeping a majority of culling algorithms enabled. For instance, the primary reason for the aforementioned visual artifacts is the difference in the culling result for the same primitive in binning and downscaled rendering. As described above, this may be due to the different viewport parameters in the binning pass and the rendering pass. Accordingly, aspects of the present disclosure may propose to keep the viewport scaling and offset parameters in downscaled rendering the same as that of the binning pass.

By keeping the viewport scaling and/or offset parameters similar in the binning and rendering passes, this may ensure an identical culling result of primitives across binning and rendering. Thus, this may help to seamlessly enable the culling algorithms in both the binning and rendering passes. For instance, in a downscaled rendering pass, the rasterizer may generate the sample coverage in the downscale domain. To achieve this, aspects of the present disclosure may perform the visibility testing of an upscaled sample space against the primitives with the same resolution as the binning pass. In some instances, this may have the same effect as determining/identifying the coverage in the downscale domain.

Figure 8:
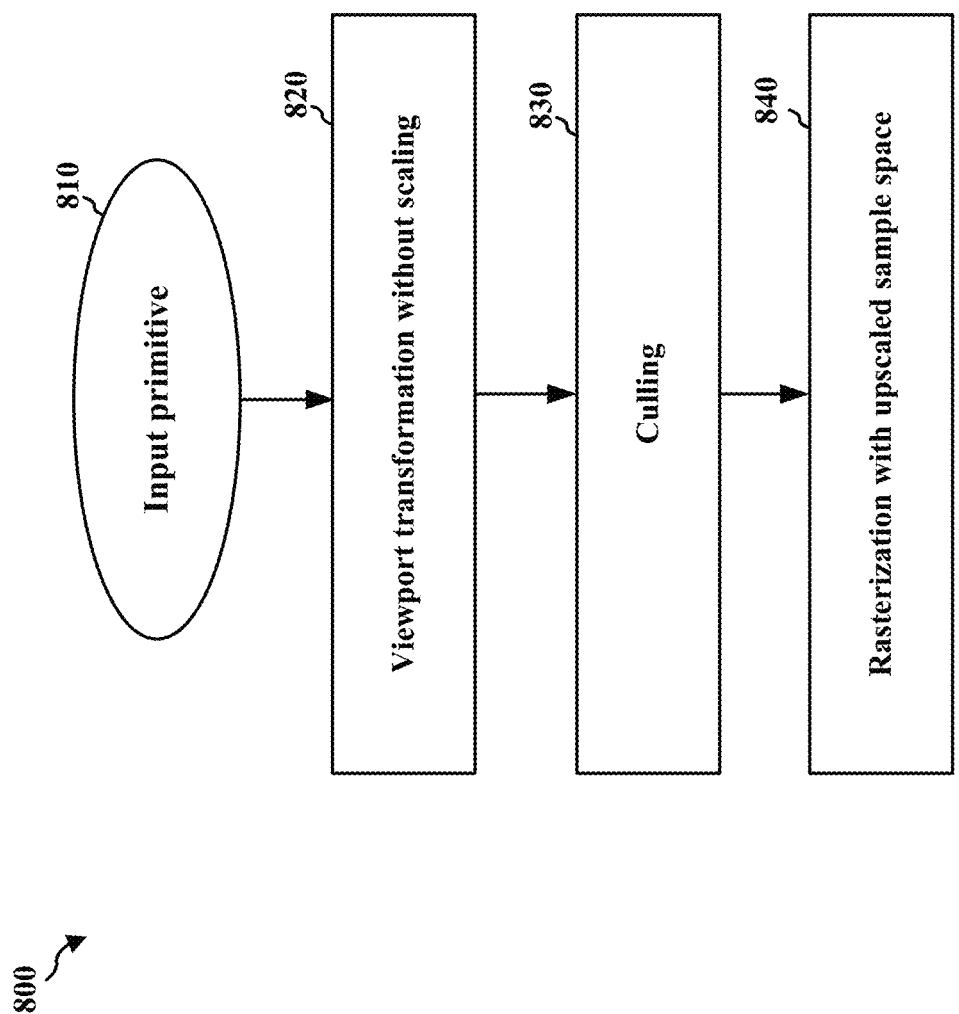
FIG. 8 is a diagram illustrating an example rendering pass.

FIG. 8 illustrates a diagram 800 of one example of a rendering pass according to aspects of the present disclosure. As shown in FIG. 8, diagram 800 is an example rendering pass including steps 810, 820, 830, and 840. More specifically, FIG. 8 displays a rendering pass including a viewport transformation without scaling compared to a binning pass. That is, the rendering pass in FIG. 8 includes viewport scaling and offset parameters that are similar to a binning pass. By doing so, the rendering pass in FIG. 8 may ensure an identical culling result of primitives across both binning and rendering passes.

As depicted in FIG. 8, at step 810, aspects of the present disclosure may receive an input primitive/triangle. At step 820, aspects of the present disclosure may perform a viewport transformation without scaling (i.e., compared to a binning pass). For instance, aspects of the present disclosure may calculate a coverage in an upscaled sample space. Further, aspects of the present disclosure may keep other parameters in a downscaled space. At step 830, aspects of the present disclosure may perform a culling process. At step 840, aspects of the present disclosure may perform a rasterization process with an upscaled sample space. As mentioned herein, steps 810-840 in the rendering pass in FIG. 8 may help to seamlessly enable the culling algorithms in both binning and rendering passes.

In some aspects, in order to keep the viewport scaling and/or offset parameters similar in binning and rendering passes, aspects of the present disclosure may utilize a number of different edge equations. More specifically, aspects of the present disclosure may multiply edge equations of primitives/triangles with different scaling factors, e.g., XY scaling factors. For instance, a rasterizer may utilize a first equation: $R=E_a X_{step}+E_b Y_{step}+C_{ref}$, where $E_a$ is an edge equation for primitive A, $E_b$ is an edge equation for primitive B, $X_{step}$ is an X step component, $Y_{step}$ is a Y step component, and $C_{ref}$ is a constant. For downscaled rasterization, $X_{step}$ and $Y_{step}$ may be multiplied by an X scaling factor ($S_x$) and a Y scaling factor ($S_y$). Therefore, the first equation may translate to a second equation=$E_a(X_{step}*S_x)$+ $E_b(Y_{step}*S_y)$+$C_{ref}$. The second equation may be rearranged to become a third equation=$(E_a*S_x)X_{step}$+$(E_b*S_y)Y_{step}$+$C_{ref}$. Further, the third equation may translate to a fourth equation=$E_a"X_{step}$+$E_b"Y_{step}$+$C_{ref}$. The fourth equation may be similar to the first equation, except for utilizing a modified form of $E_a$ (i.e., $E_a"$) and a modified form of $E_b$ (i.e., $E_b"$). As indicated above, from the third equation, if $E_a$ and $E_b$ are multiplied by the ScaleX ($S_x$) and ScaleY ($S_y$) factors, respectively, this may result in moving the samples into the upscaled space.

Additionally, aspects of the present disclosure may utilize different steps for the edge equations in order to keep the viewport scaling and/or offset parameters similar in the binning and rendering passes. For instance, a rasterizer equation (R) for a binning process may be: R=Ea*X+Eb*Y+$C_{init}$, where $E_a$ is an edge equation for primitive A, $E_b$ is an edge equation for primitive B, X is an X component, Y is a Y component, and $C_{init}$ is an initial constant. For a front facing primitive, test point (X, Y) may be: inside of a certain line if R>0, outside of the line if R<0, and on the line if R=0. Additionally, a second rasterizer equation in downscaled rendering (R') with scaling factors ScaleX and ScaleY in the X direction and the Y direction, respectively, may be: R'=$E_a'$*X'+Eb'*Y'+$C_{init}'$, where $E_a'=E_a$/ScaleY, $E_b'=E_b$/ScaleX, and $C_{init}'=C_{init}$/(ScaleX*ScaleY). Based on the above equations, R'*ScaleX*ScaleY=$(E_a$*ScaleX)*X'+ $(E_b$*ScaleY)*Y'+$C_{init}$. In some instances, if ScaleX and ScaleY are positive, the sign of the above equation may be sufficient to perform the edge test. As such, a third rasterizer equation corresponding to primitives' edges in downscaled rendering (R") may be: R"=$E_a"$*X'+$E_b"$*Y'+$C_{init}$, where $E_a"=E_a$*ScaleX and $E_b"=E_b$*ScaleY.

Aspects of the present disclosure may utilize the aforementioned edge equations, e.g., third rasterizer equation (R"), in edge testing of a sample against the primitives' edges in the downscaled rendering. The aforementioned edge equations of aspects of the present disclosure may include a number of benefits or advantages. For instance, the aforementioned edge equations may allow for a fast and robust strategy for foveated-binned rendering by keeping the culling algorithms intact. More specifically, these edge equations may allow for a robust foveation strategy that may not hamper the GPU performance by keeping culling algorithms enabled. These edge equations may also allow for an artifact-free, robust and fast binned foveation strategy. Further, these edge equations may allow aspects of the present disclosure to not compromise on GPU performance, as the proposed strategy may help keep the culling algorithm enabled.

Figure 9:
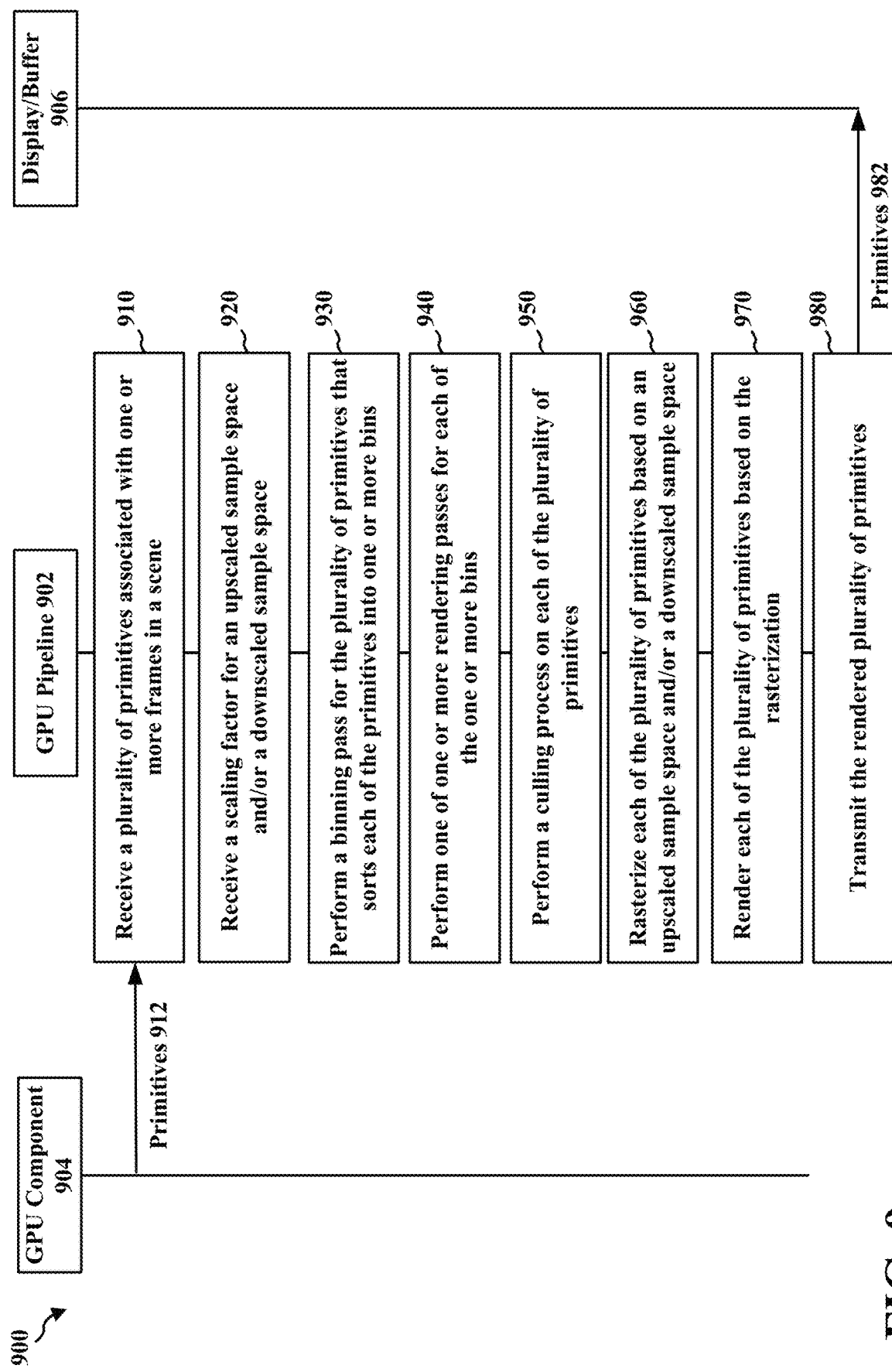
FIG. 9 is a communication flow diagram illustrating example communications between a GPU pipeline, a GPU component, and a display/buffer.

FIG. 9 is a communication flow diagram 900 of graphics processing in accordance with one or more techniques of this disclosure. As shown in FIG. 9, diagram 900 includes example communications between GPU pipeline 902 (e.g., component in a GPU pipeline), GPU component 904 (e.g., another component in a GPU pipeline), and display or buffer 906, in accordance with one or more techniques of this disclosure.

At 910, GPU pipeline 902 may receive a plurality of primitives associated with one or more frames in a scene, e.g., primitives 912, a portion of the scene being associated with at least one of an upscaled sample space for the plurality of primitives or a downscaled sample space for the plurality of primitives. The plurality of primitives may be received from at least one application outside of a graphics processing unit (GPU) pipeline or at least one game outside of the GPU pipeline.

At 920, GPU pipeline 902 may receive, from a graphics processing unit (GPU) driver, a scaling factor for at least one of the upscaled sample space or the downscaled sample space. In some aspects, at least one of the upscaled sample space or the downscaled sample space may correspond to the scaling factor.

At 930, GPU pipeline 902 may perform a binning pass for the plurality of primitives, the binning pass being associated with an unscaled sample space for the plurality of primitives, where the binning pass sorts each of the plurality of primitives into one or more bins associated with each of the one or more frames. In some instances, the binning pass may assign each of the plurality of primitives into the one or more bins in which each primitive appears using the unscaled sample space.

At 940, GPU pipeline 902 may perform one of one or more rendering passes for each of the one or more bins, each of the one or more rendering passes being associated with at least one of the upscaled sample space or the downscaled sample space, each of the one or more rendering passes including a viewport transformation for each of the plurality of primitives. The one or more rendering passes may be associated with a foveated rendering process.

In some aspects, the viewport transformation for each of the plurality of primitives may be associated with the unscaled sample space for the plurality of primitives. Also, the viewport transformation may be associated with at least one of a viewport scale or at least one offset parameter of the viewport transformation being unscaled. The viewport transformation may also be associated with maintaining each of multiple geometric parameters for all of the plurality of primitives in the unscaled sample space.

At 950, GPU pipeline 902 may perform a culling process on each of the plurality of primitives after performing the one of the one or more rendering passes for each of the plurality of primitives.

At 960, GPU pipeline 902 may rasterize each of the plurality of primitives based on at least one of the upscaled sample space or the downscaled sample space. In some instances, GPUs herein may calculate a coverage of each of the plurality of primitives in at least one of the upscaled sample space or the downscaled sample space. For instance, rasterizing each of the plurality of primitives may further include calculating a coverage of each of the plurality of primitives in at least one of the upscaled sample space or the downscaled sample space. Also, GPUs herein may modify one or more edge coefficients for each of the plurality of primitives. For example, calculating the coverage of each of the plurality of primitives may further include modifying one or more edge coefficients for each of the plurality of primitives.

At 970, GPU pipeline 902 may render each of the plurality of primitives based on the rasterization of each of the plurality of primitives.

At 980, GPU pipeline 902 may transmit the rendered plurality of primitives, e.g., primitives 982, after rendering each of the plurality of primitives. The rendered plurality of primitives may be transmitted to at least one of a display or a memory buffer.

Figure 10:
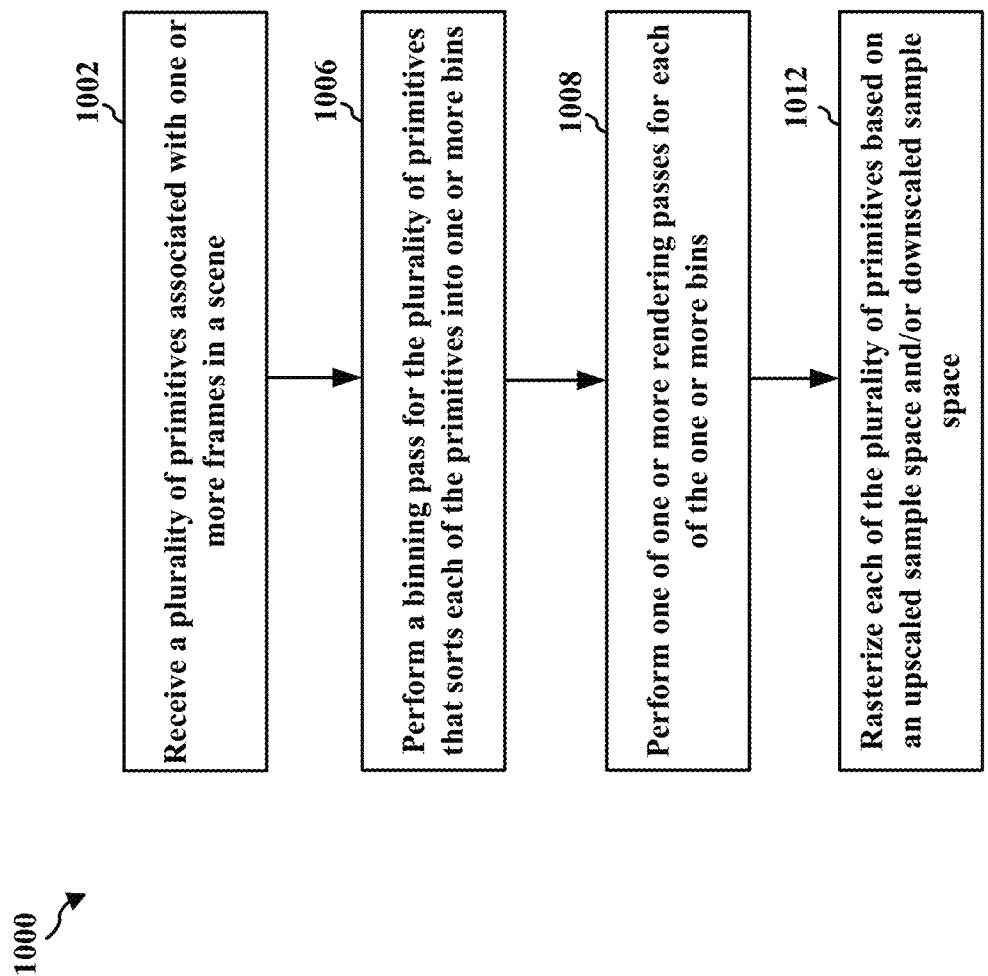
FIG. 10 is a flowchart of an example method of graphics processing.

FIG. 10 is a flowchart 1000 of an example method of graphics processing in accordance with one or more techniques of this disclosure. The method may be performed by a GPU, such as an apparatus for graphics processing, another graphics processor, a GPU pipeline, a wireless communication device, and/or any apparatus that may perform graphics processing as used in connection with the examples of FIGS. 1-9.

At 1002, the GPU may receive a plurality of primitives associated with one or more frames in a scene, a portion of the scene being associated with at least one of an upscaled sample space for the plurality of primitives or a downscaled sample space for the plurality of primitives, as described in connection with the examples in FIGS. 1-9. For example, as described in 910 of FIG. 9, GPU pipeline 902 may receive a plurality of primitives associated with one or more frames in a scene, a portion of the scene being associated with at least one of an upscaled sample space for the plurality of primitives or a downscaled sample space for the plurality of primitives. Further, step 1002 may be performed by processing unit 120 in FIG. 1. The plurality of primitives may be received from at least one application outside of a graphics processing unit (GPU) pipeline or at least one game outside of the GPU pipeline.

At 1006, the GPU may perform a binning pass for the plurality of primitives, the binning pass being associated with an unscaled sample space for the plurality of primitives, where the binning pass sorts each of the plurality of primitives into one or more bins associated with each of the one or more frames, as described in connection with the examples in FIGS. 1-9. For example, as described in 930 of FIG. 9, GPU pipeline 902 may perform a binning pass for the plurality of primitives, the binning pass being associated with an unscaled sample space for the plurality of primitives, where the binning pass sorts each of the plurality of primitives into one or more bins associated with each of the one or more frames. Further, step 1006 may be performed by processing unit 120 in FIG. 1. In some instances, the binning pass may assign each of the plurality of primitives into the one or more bins in which each primitive appears using the unscaled sample space.

At 1008, the GPU may perform one of one or more rendering passes for each of the one or more bins, each of the one or more rendering passes being associated with at least one of the upscaled sample space or the downscaled sample space, each of the one or more rendering passes including a viewport transformation for each of the plurality of primitives, as described in connection with the examples in FIGS. 1-9. For example, as described in 940 of FIG. 9, GPU pipeline 902 may perform one of one or more rendering passes for each of the one or more bins, each of the one or more rendering passes being associated with at least one of the upscaled sample space or the downscaled sample space, each of the one or more rendering passes including a viewport transformation for each of the plurality of primitives. Further, step 1008 may be performed by processing unit 120 in FIG. 1. The one or more rendering passes may be associated with a foveated rendering process.

In some aspects, the viewport transformation for each of the plurality of primitives may be associated with the unscaled sample space for the plurality of primitives. Also, the viewport transformation may be associated with at least one of a viewport scale or at least one offset parameter of the viewport transformation being unscaled. The viewport transformation may also be associated with maintaining each of multiple geometric parameters for all of the plurality of primitives in the unscaled sample space.

At 1012, the GPU may rasterize each of the plurality of primitives based on at least one of the upscaled sample space or the downscaled sample space, as described in connection with the examples in FIGS. 1-9. For example, as described in 960 of FIG. 9, GPU pipeline 902 may rasterize each of the plurality of primitives based on at least one of the upscaled sample space or the downscaled sample space. Further, step 1012 may be performed by processing unit 120 in FIG. 1. In some instances, GPUs herein may calculate a coverage of each of the plurality of primitives in at least one of the upscaled sample space or the downscaled sample space. For instance, rasterizing each of the plurality of primitives may further include calculating a coverage of each of the plurality of primitives in at least one of the upscaled sample space or the downscaled sample space. Also, GPUs herein may modify one or more edge coefficients for each of the plurality of primitives. For example, calculating the coverage of each of the plurality of primitives may further include modifying one or more edge coefficients for each of the plurality of primitives.

Figure 11:
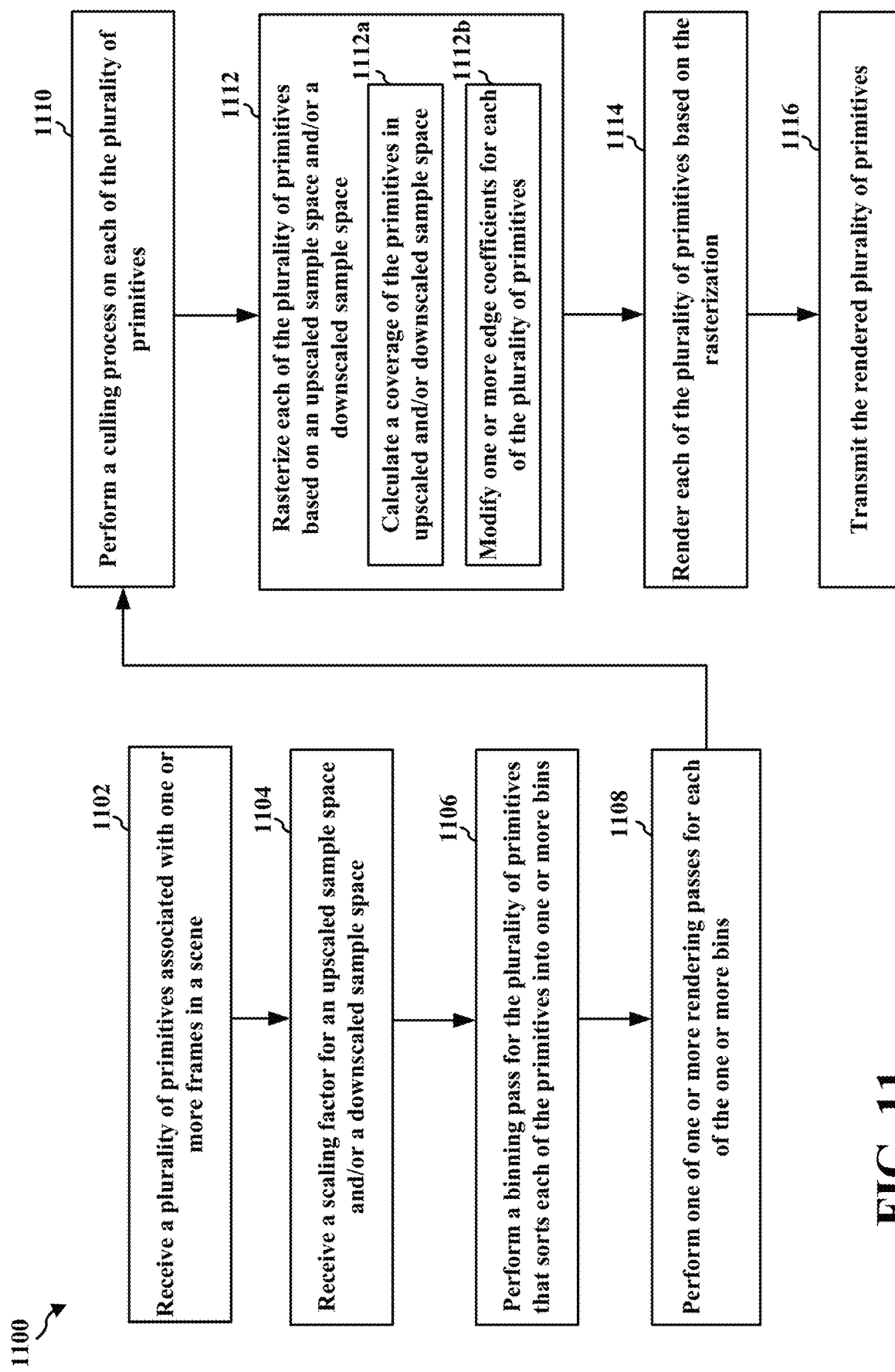
FIG. 11 is a flowchart of an example method of graphics processing.

FIG. 11 is a flowchart 1100 of an example method of graphics processing in accordance with one or more techniques of this disclosure. The method may be performed by a GPU, such as an apparatus for graphics processing, another graphics processor, a GPU pipeline, a wireless communication device, and/or any apparatus that may perform graphics processing as used in connection with the examples of FIGS. 1-9.

At 1102, the GPU may receive a plurality of primitives associated with one or more frames in a scene, a portion of the scene being associated with at least one of an upscaled sample space for the plurality of primitives or a downscaled sample space for the plurality of primitives, as described in connection with the examples in FIGS. 1-9. For example, as described in 910 of FIG. 9, GPU pipeline 902 may receive a plurality of primitives associated with one or more frames in a scene, a portion of the scene being associated with at least one of an upscaled sample space for the plurality of primitives or a downscaled sample space for the plurality of primitives. Further, step 1102 may be performed by processing unit 120 in FIG. 1. The plurality of primitives may be received from at least one application outside of a graphics processing unit (GPU) pipeline or at least one game outside of the GPU pipeline.

At 1104, the GPU may receive, from a GPU driver, a scaling factor for at least one of the upscaled sample space or the downscaled sample space, as described in connection with the examples in FIGS. 1-9. For example, as described in 920 of FIG. 9, GPU pipeline 902 may receive, from a GPU driver, a scaling factor for at least one of the upscaled sample space or the downscaled sample space. Further, step 1104 may be performed by processing unit 120 in FIG. 1. In some aspects, at least one of the upscaled sample space or the downscaled sample space may correspond to the scaling factor.

At 1106, the GPU may perform a binning pass for the plurality of primitives, the binning pass being associated with an unscaled sample space for the plurality of primitives, where the binning pass sorts each of the plurality of primitives into one or more bins associated with each of the one or more frames, as described in connection with the examples in FIGS. 1-9. For example, as described in 930 of FIG. 9, GPU pipeline 902 may perform a binning pass for the plurality of primitives, the binning pass being associated with an unscaled sample space for the plurality of primitives, where the binning pass sorts each of the plurality of primitives into one or more bins associated with each of the one or more frames. Further, step 1106 may be performed by processing unit 120 in FIG. 1. In some instances, the binning pass may assign each of the plurality of primitives into the one or more bins in which each primitive appears using the unscaled sample space.

At 1108, the GPU may perform one of one or more rendering passes for each of the one or more bins, each of the one or more rendering passes being associated with at least one of the upscaled sample space or the downscaled sample space, each of the one or more rendering passes including a viewport transformation for each of the plurality of primitives, as described in connection with the examples in FIGS. 1-9. For example, as described in 940 of FIG. 9, GPU pipeline 902 may perform one of one or more rendering passes for each of the one or more bins, each of the one or more rendering passes being associated with at least one of the upscaled sample space or the downscaled sample space, each of the one or more rendering passes including a viewport transformation for each of the plurality of primitives. Further, step 1108 may be performed by processing unit 120 in FIG. 1. The one or more rendering passes may be associated with a foveated rendering process.

In some aspects, the viewport transformation for each of the plurality of primitives may be associated with the unscaled sample space for the plurality of primitives. Also, the viewport transformation may be associated with at least one of a viewport scale or at least one offset parameter of the viewport transformation being unscaled. The viewport transformation may also be associated with maintaining each of multiple geometric parameters for all of the plurality of primitives in the unscaled sample space.

At 1110, the GPU may perform a culling process on each of the plurality of primitives after performing the one of the one or more rendering passes for each of the plurality of primitives, as described in connection with the examples in FIGS. 1-9. For example, as described in 950 of FIG. 9, GPU pipeline 902 may perform a culling process on each of the plurality of primitives after performing the one of the one or more rendering passes for each of the plurality of primitives. Further, step 1110 may be performed by processing unit 120 in FIG. 1.

At 1112, the GPU may rasterize each of the plurality of primitives based on at least one of the upscaled sample space or the downscaled sample space, as described in connection with the examples in FIGS. 1-9. For example, as described in 960 of FIG. 9, GPU pipeline 902 may rasterize each of the plurality of primitives based on at least one of the upscaled sample space or the downscaled sample space. Further, step 1112 may be performed by processing unit 120 in FIG. 1. In some instances, at 1112*a*, the GPU may calculate a coverage of each of the plurality of primitives in at least one of the upscaled sample space or the downscaled sample space. For instance, rasterizing each of the plurality of primitives may further include calculating a coverage of each of the plurality of primitives in at least one of the upscaled sample space or the downscaled sample space. Also, at 1112*b*, the GPU may modify one or more edge coefficients for each of the plurality of primitives. For example, calculating the coverage of each of the plurality of primitives may further include modifying one or more edge coefficients for each of the plurality of primitives.

At 1114, the GPU may render each of the plurality of primitives based on the rasterization of each of the plurality of primitives, as described in connection with the examples in FIGS. 1-9. For example, as described in 970 of FIG. 9, GPU pipeline 902 may render each of the plurality of primitives based on the rasterization of each of the plurality of primitives. Further, step 1114 may be performed by processing unit 120 in FIG. 1.

At 1116, the GPU may transmit the rendered plurality of primitives after rendering each of the plurality of primitives, as described in connection with the examples in FIGS. 1-9. For example, as described in 980 of FIG. 9, GPU pipeline 902 may transmit the rendered plurality of primitives after rendering each of the plurality of primitives. Further, step 1116 may be performed by processing unit 120 in FIG. 1. The rendered plurality of primitives may be transmitted to at least one of a display or a memory buffer.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus, e.g., processing unit 120, may include means for receiving a plurality of primitives associated with one or more frames in a scene, a portion of the scene being associated with at least one of an upscaled sample space for the plurality of primitives or a downscaled sample space for the plurality of primitives; means for performing a binning pass for the plurality of primitives, the binning pass being associated with an unscaled sample space for the plurality of primitives, where the binning pass sorts each of the plurality of primitives into one or more bins associated with each of the one or more frames; means for performing one of one or more rendering passes for each of the one or more bins, each of the one or more rendering passes being associated with at least one of the upscaled sample space or the downscaled sample space, each of the one or more rendering passes including a viewport transformation for each of the plurality of primitives; means for rasterizing each of the plurality of primitives based on at least one of the upscaled sample space or the downscaled sample space; means for performing a culling process on each of the plurality of primitives after performing the one of the one or more rendering passes for each of the plurality of primitives; means for receiving, from a graphics processing unit (GPU) driver, the scaling factor for at least one of the upscaled sample space or the downscaled sample space; means for calculating a coverage of each of the plurality of primitives in at least one of the upscaled sample space or the downscaled sample space; means for modifying one or more edge coefficients for each of the plurality of primitives; means for rendering each of the plurality of primitives based on the rasterization of each of the plurality of primitives; and means for transmitting the rendered plurality of primitives after rendering each of the plurality of primitives.

The subject matter described herein may be implemented to realize one or more benefits or advantages. For instance, the described graphics processing techniques may be used by a GPU, a graphics processor, or some other processor that may perform graphics processing to implement the binning and rendering techniques described herein. This may also be accomplished at a low cost compared to other graphics processing techniques. Moreover, the graphics processing techniques herein may improve or speed up data processing or execution. Further, the graphics processing techniques herein may improve resource or data utilization and/or resource efficiency. Additionally, aspects of the present disclosure may utilize unscaled binning and rendering techniques in order to improve memory bandwidth efficiency and/or increase processing speed at a GPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for graphics processing including at least one processor coupled to a memory and configured to: receive a plurality of primitives associated with one or more frames in a scene, a portion of the scene being associated with at least one of an upscaled sample space for the plurality of primitives or a downscaled sample space for the plurality of primitives; perform a binning pass for the plurality of primitives, the binning pass being associated with an unscaled sample space for the plurality of primitives, where the binning pass sorts each of the plurality of primitives into one or more bins associated with each of the one or more frames; perform one of one or more rendering passes for each of the one or more bins, each of the one or more rendering passes being associated with at least one of the upscaled sample space or the downscaled sample space, each of the one or more rendering passes including a viewport transformation for each of the plurality of primitives; and rasterize each of the plurality of primitives based on at least one of the upscaled sample space or the downscaled sample space.

Aspect 2 is the apparatus of aspect 1, where the viewport transformation for each of the plurality of primitives is associated with the unscaled sample space for the plurality of primitives.

Aspect 3 is the apparatus of any of aspects 1 and 2, where the viewport transformation is associated with at least one of a viewport scale or at least one offset parameter of the viewport transformation being unscaled.

Aspect 4 is the apparatus of any of aspects 1 to 3, where the viewport transformation is associated with maintaining each of multiple geometric parameters for all of the plurality of primitives in the unscaled sample space.

Aspect 5 is the apparatus of any of aspects 1 to 4, where the binning pass assigns each of the plurality of primitives into the one or more bins in which each primitive appears using the unscaled sample space.

Aspect 6 is the apparatus of any of aspects 1 to 5, where the at least one processor is further configured to: perform a culling process on each of the plurality of primitives after performing the one of the one or more rendering passes for each of the plurality of primitives.

Aspect 7 is the apparatus of any of aspects 1 to 6, where at least one of the upscaled sample space or the downscaled sample space corresponds to a scaling factor.

Aspect 8 is the apparatus of any of aspects 1 to 7, where the at least one processor is further configured to: receive, from a graphics processing unit (GPU) driver, the scaling factor for at least one of the upscaled sample space or the downscaled sample space.

Aspect 9 is the apparatus of any of aspects 1 to 8, where to rasterize each of the plurality of primitives, the at least one processor is further configured to: calculate a coverage of each of the plurality of primitives in at least one of the upscaled sample space or the downscaled sample space.

Aspect 10 is the apparatus of any of aspects 1 to 9, where to calculate the coverage of each of the plurality of primitives, the at least one processor is further configured to: modify one or more edge coefficients for each of the plurality of primitives.

Aspect 11 is the apparatus of any of aspects 1 to 10, where the at least one processor is further configured to: render each of the plurality of primitives based on the rasterization of each of the plurality of primitives.

Aspect 12 is the apparatus of any of aspects 1 to 11, where the at least one processor is further configured to: transmit the rendered plurality of primitives after rendering each of the plurality of primitives.

Aspect 13 is the apparatus of any of aspects 1 to 12, where the rendered plurality of primitives is transmitted to at least one of a display or a memory buffer.

Aspect 14 is the apparatus of any of aspects 1 to 13, where the one or more rendering passes are associated with a foveated rendering process.

Aspect 15 is the apparatus of any of aspects 1 to 14, where the plurality of primitives is received from at least one application outside of a graphics processing unit (GPU) pipeline or at least one game outside of the GPU pipeline.

Aspect 16 is the apparatus of any of aspects 1 to 15, further including at least one of an antenna or a transceiver coupled to the at least one processor.

Aspect 17 is a method of graphics processing for implementing any of aspects 1 to 16.

Aspect 18 is an apparatus for graphics processing including means for implementing any of aspects 1 to 16.

Aspect 19 is a computer-readable medium storing computer executable code, the code when executed by a processor causes the at least one processor to implement any of aspects 1 to 16.

What is claimed is:

1. An apparatus for graphics processing, comprising:
a memory; and
at least one processor coupled to the memory and configured to:
receive a plurality of primitives associated with one or more frames in a scene, a portion of the scene being associated with at least one of an upscaled sample space for the plurality of primitives or a downscaled sample space for the plurality of primitives;
perform a binning pass for the plurality of primitives, the binning pass being associated with an unscaled sample space for the plurality of primitives, wherein the binning pass sorts each of the plurality of primitives into one or more bins associated with each of the one or more frames;
perform one of one or more rendering passes for each of the one or more bins, each of the one or more rendering passes being associated with at least one of the upscaled sample space or the downscaled sample space, each of the one or more rendering passes including a viewport transformation for each of the plurality of primitives;
perform a culling process on each of the plurality of primitives after performing the one of the one or more rendering passes for each of the one or more bins; and
rasterize each of the plurality of primitives based on at least one of the upscaled sample space or the downscaled sample space,
wherein to rasterize each of the plurality of primitives, the at least one processor is configured to:
calculate a coverage of each of the plurality of primitives in at least one of the upscaled sample space or the downscaled sample space, and
wherein to calculate the coverage of each of the plurality of primitives, the at least one processor is configured to:
modify one or more edge coefficients for each of the plurality of primitives with XY scaling factors,
wherein the rasterize each of the plurality of primitives is based on an equation:
R=EaXstep+EbYstep+Cref, where Ea is an edge equation for a first primitive A, Eb is an edge equation for a second primitive B, Xstep is an X step component, Ystep is a Y step component, and Cref is a constant.

2. The apparatus of claim 1, wherein the viewport transformation for each of the plurality of primitives is associated with the unscaled sample space for the plurality of primitives.

3. The apparatus of claim 2, wherein the viewport transformation is associated with at least one offset parameter of the viewport transformation being unscaled.

4. The apparatus of claim 2, wherein the viewport transformation is associated with maintaining each of multiple geometric parameters for all of the plurality of primitives in the unscaled sample space.

5. The apparatus of claim 1, wherein the binning pass assigns each of the plurality of primitives into the one or more bins in which each primitive appears using the unscaled sample space.

6. The apparatus of claim 1, wherein at least one of the upscaled sample space or the downscaled sample space corresponds to a scaling factor.

7. The apparatus of claim 6, wherein the at least one processor is further configured to:
receive, from a graphics processing unit (GPU) driver, the scaling factor for at least one of the upscaled sample space or the downscaled sample space.

8. The apparatus of claim 1, wherein the at least one processor is further configured to:
render each of the plurality of primitives based on the rasterization of each of the plurality of primitives.

9. The apparatus of claim 8, wherein the at least one processor is further configured to:
transmit the rendered plurality of primitives after rendering each of the plurality of primitives.

10. The apparatus of claim 9, wherein to transmit the rendered plurality of primitives, the at least one processor is configured to transmit the rendered plurality of primitives to at least one of a display or a memory buffer.

11. The apparatus of claim 1, wherein the one or more rendering passes are associated with a foveated rendering process.

12. The apparatus of claim 1, further comprising a transceiver coupled to the at least one processor, wherein to receive the plurality of primitives, the at least one processor is configured to receive, via the transceiver, the plurality of primitives from at least one application outside of a graphics processing unit (GPU) pipeline.

13. A method of graphics processing, comprising:
receiving a plurality of primitives associated with one or more frames in a scene, a portion of the scene being associated with at least one of an upscaled sample space for the plurality of primitives or a downscaled sample space for the plurality of primitives;
performing a binning pass for the plurality of primitives, the binning pass being associated with an unscaled sample space for the plurality of primitives, wherein the binning pass sorts each of the plurality of primitives into one or more bins associated with each of the one or more frames;
performing one of one or more rendering passes for each of the one or more bins, each of the one or more rendering passes being associated with at least one of the upscaled sample space or the downscaled sample space, each of the one or more rendering passes including a viewport transformation for each of the plurality of primitives;
performing a culling process on each of the plurality of primitives after performing the one of the one or more rendering passes for each of the one or more bins; and
rasterizing each of the plurality of primitives based on at least one of the upscaled sample space or the downscaled sample space,
wherein rasterizing each of the plurality of primitives comprises:
calculating a coverage of each of the plurality of primitives in at least one of the upscaled sample space or the downscaled sample space, and
wherein calculating the coverage of each of the plurality of primitives comprises:
modifying one or more edge coefficients for each of the plurality of primitives with XY scaling factors,
wherein the rasterizing each of the plurality of primitives is based on an equation:
R=EaXstep+EbYstep+Cref, where Ea is an edge equation for a first primitive A, Eb is an edge equation for a second primitive B, Xstep is an X step component, Ystep is a Y step component, and Cref is a constant.

14. The method of claim 13, wherein the viewport transformation for each of the plurality of primitives is associated with the unscaled sample space for the plurality of primitives.

15. The method of claim 14, wherein the viewport transformation is associated with at least one offset parameter of the viewport transformation being unscaled.

16. The method of claim 14, wherein the viewport transformation is associated with maintaining each of multiple geometric parameters for all of the plurality of primitives in the unscaled sample space.

17. The method of claim 13, wherein the binning pass assigns each of the plurality of primitives into the one or more bins in which each primitive appears using the unscaled sample space.

18. The method of claim 13, wherein at least one of the upscaled sample space or the downscaled sample space corresponds to a scaling factor.

19. The method of claim 18, further comprising:
receiving, from a graphics processing unit (GPU) driver, the scaling factor for at least one of the upscaled sample space or the downscaled sample space.

20. The method of claim 13, further comprising:
rendering each of the plurality of primitives based on the rasterization of each of the plurality of primitives.

21. The method of claim 20, further comprising:
transmitting the rendered plurality of primitives after rendering each of the plurality of primitives.

22. The method of claim 21, wherein the rendered plurality of primitives is transmitted to at least one of a display or a memory buffer.

23. The method of claim 13, wherein the one or more rendering passes are associated with a foveated rendering process.

24. The method of claim 13, wherein the plurality of primitives is received from at least one application outside of a graphics processing unit (GPU) pipeline.

25. An apparatus for graphics processing, comprising:
means for receiving a plurality of primitives associated with one or more frames in a scene, a portion of the scene being associated with at least one of an upscaled sample space for the plurality of primitives or a downscaled sample space for the plurality of primitives;
means for performing a binning pass for the plurality of primitives, the binning pass being associated with an unsealed sample space for the plurality of primitives, wherein the binning pass sorts each of the plurality of primitives into one or more bins associated with each of the one or more frames;
means for performing one of one or more rendering passes for each of the one or more bins, each of the one or more rendering passes being associated with at least one of the upscaled sample space or the downscaled sample space, each of the one or more rendering passes including a viewport transformation for each of the plurality of primitives;

means for performing a culling process on each of the plurality of primitives after performing the one of the one or more rendering passes for each of the one or more bins; and means for rasterizing each of the plurality of primitives based on at least one of the upscaled sample space or the downscaled sample space, wherein means for rasterizing each of the plurality of primitives comprises:

means for calculating a coverage of each of the plurality of primitives in at least one of the upscaled sample space or the downscaled sample space, and wherein means for calculating the coverage of each of the plurality of primitives comprises:

means for modifying one or more edge coefficients for each of the plurality of primitives with XY scaling factors, wherein the means for rasterizing each of the plurality of primitives is based on an equation:

$R = E_a X_{step} + E_b Y_{step} + C_{ref}$, where $E_a$ is an edge equation for a first primitive A, $E_b$ is an edge equation for a second primitive B, $X_{step}$ is an X step component, $Y_{step}$ is a Y step component, and $C_{ref}$ is a constant.

26. A non-transitory computer-readable medium storing computer executable code for graphics processing, the code when executed by a processor causes the processor to:

receive a plurality of primitives associated with one or more frames in a scene, a portion of the scene being associated with at least one of an upscaled sample space for the plurality of primitives or a downscaled sample space for the plurality of primitives;

perform a binning pass for the plurality of primitives, the binning pass being associated with an unscaled sample space for the plurality of primitives, wherein the binning pass sorts each of the plurality of primitives into one or more bins associated with each of the one or more frames;

perform one of one or more rendering passes for each of the one or more bins, each of the one or more rendering passes being associated with at least one of the upscaled sample space or the downscaled sample space, each of the one or more rendering passes including a viewport transformation for each of the plurality of primitives;

perform a culling process on each of the plurality of primitives after performing the one of the one or more rendering passes for each of the one or more bins; and rasterize each of the plurality of primitives based on at least one of the upscaled sample space or the downscaled sample space, wherein rasterize each of the plurality of primitives comprises:

calculate a coverage of each of the plurality of primitives in at least one of the upscaled sample space or the downscaled sample space, and wherein calculate the coverage of each of the plurality of primitives comprises:

modify one or more edge coefficients for each of the plurality of primitives with XY scaling factors, wherein the rasterize each of the plurality of primitives is based on an equation:

$R = E_a X_{step} + E_b Y_{step} + C_{ref}$, where $E_a$ is an edge equation for a first primitive A, $E_b$ is an edge equation for a second primitive B, $X_{step}$ is an X step component, $Y_{step}$ is a Y step component, and $C_{ref}$ is a constant.

* * * * *